United States Patent [19]
Heath et al.

[11] Patent Number: 5,622,327
[45] Date of Patent: Apr. 22, 1997

[54] EMERGENCY LOCKING SEAT BELT RETRACTOR

[75] Inventors: Robert B. Heath, Brighton, Australia; James R. Chinni, Indianapolis, Ind.; Steven H. Wallen, Noblesville, Ind.; James R. Anthony, Carmel, Ind.

[73] Assignee: Indiana Mills and Manufacturing, Inc., Westfield, Ind.

[21] Appl. No.: 521,301

[22] Filed: Aug. 29, 1995

[51] Int. Cl.⁶ .................................................. B60R 22/36
[52] U.S. Cl. ...................... 242/383.4; 242/384.6
[58] Field of Search .............................. 242/382.1, 382.4, 242/383, 383.2, 383.4, 384, 384.6; 280/806, 807

[56] References Cited

U.S. PATENT DOCUMENTS

| | | | |
|---|---|---|---|
| 3,873,041 | 3/1975 | Rumpf et al. | 242/382.1 |
| 3,944,163 | 3/1976 | Hayashi et al. | 242/382.1 |
| 4,087,059 | 5/1978 | Lindblad | 242/384.6 |
| 4,171,782 | 10/1979 | Rumpf | 242/382.1 |
| 4,522,350 | 6/1985 | Ernst . | |
| 4,572,456 | 2/1986 | Makishima | 242/382.1 |
| 4,586,678 | 5/1986 | Saito et al. | 242/382.1 |
| 4,936,601 | 6/1990 | Tada | 242/384.6 |
| 4,979,695 | 12/1990 | Matsuki et al. | 242/384.6 |

*Primary Examiner*—John P. Darling
*Attorney, Agent, or Firm*—Woodard, Emhardt, Naughton, Moriarty & McNett

[57] ABSTRACT

An emergency locking seatbelt retractor. The retractor includes a pivoting lock plate which can pivot through a limited arc during activation of a webbing sensor or a vehicle sensor. When the lock plate is in its quiescent position, a pin thereon operates to hold a lock bar out of engagement with ratchet teeth on the webbing spool, thereby allowing free rotation of the spool. If either or both of the webbing sensor and vehicle sensor are activated, the lock plate is caused to pivot, drawing the pin away from the lock bar and allowing the lock bar to engage the ratchet teeth, thereby locking the retractor. Additionally, the locking initiation mechanism (the lock plate) and the sensors are isolated from webbing withdrawal forces and may therefore be constructed of lightweight, inexpensive materials. The retractor includes a vehicle sensor which is effective in substantially eliminating any vertical motion of the sensor ball. This prevents the retractor from locking when it is subjected to a downward acceleration.

25 Claims, 9 Drawing Sheets

EMERGENCY LOCKING SEAT BELT RETRACTOR

TECHNICAL FIELD OF THE INVENTION

The present invention generally relates to seatbelt retractors and, more particularly, to emergency locking seatbelt retractors.

BACKGROUND OF THE INVENTION

Seatbelts, such as those used in the automotive industry, are commonly provided with a spring biased retractor spool. Such a retractor automatically retracts the seatbelt webbing onto the spool to the extent that the spring bias force is not overcome by an extension force applied to the webbing. Therefore, the webbing will be automatically retracted onto the spool if the seatbelt is removed by the passenger. Additionally, if the passenger is wearing the seatbelt, the spring biased retractor will automatically size the seat belt to the passenger by removing any slack from the seatbelt. Except during the situations described hereinbelow, the webbing may be extended from the retractor whenever enough force is applied to the webbing to overcome the spring bias force of the retractor.

In order for the seatbelt to retain the passenger in the seat during an emergency situation, however, it is necessary for the retractor to lock and thereby prevent any further extension of the webbing from the retractor. This type of device is known as an emergency locking retractor. The emergency locking feature is generally activated in two different ways. First, the retractor is fitted with a webbing sensor which senses rapid extension of the webbing from the retractor and locks the retractor in response thereto. The webbing sensor is generally a flyweight which moves m response to rapid rotation of the retractor, causing an adjacent pawl to engage a toothed surface of the retractor, thereby preventing further extension of the webbing from the retractor.

A second type of emergency locking feature is provided by fitting the retractor with a vehicle sensor, which senses rapid acceleration or deceleration of the vehicle. The vehicle sensor is generally a metal ball which is confined within an enclosed space. Any rapid acceleration or deceleration of the vehicle will cause the metal ball to be displaced from its normal resting position, thereby activating a retractor locking mechanism.

Such prior art emergency locking retractors provide important safety benefits, however they do exhibit some undesirable characteristics. For example, if the vehicle is parked on a slant from the horizontal, then it is possible for the metal ball of the vehicle sensor to be displaced from its normal resting position, thereby triggering the emergency locking feature of the retractor. Any attempt to withdraw the webbing from the retractor will be unsuccessful, preventing the seatbelt from being worn until the vehicle is moved to a suitably less inclined attitude.

Another problem results when the emergency locking retractor is not locked by the vehicle sensor and the webbing is rapidly withdrawn with such force as to trigger the webbing sensor. Further withdrawal will be prevented, causing frustration to the heavy handed user and discouraging the use of the seatbelt.

A further problem can result if the webbing is allowed to retract rapidly into an emergency locking retractor, coming to a stop at the fully retracted position. In this situation, the webbing sensor may be forced into the locking mode, thereby preventing all subsequent withdrawal of the webbing and rendering the seatbelt inoperative.

Figure 1:
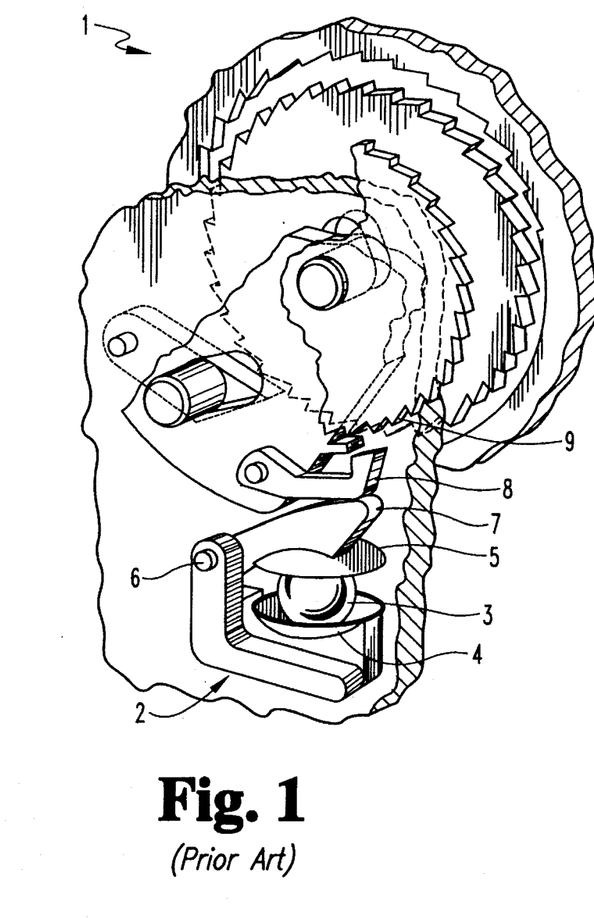
FIG. 1 is a perspective view of a prior art emergency locking retractor in an unlocked state.
Figure 2:
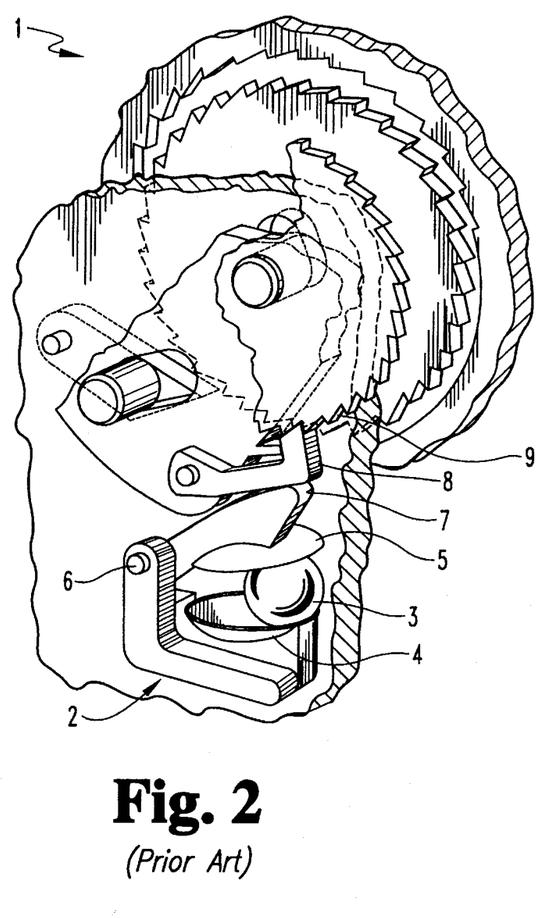
FIG. 2 is a perspective view of the prior art emergency locking retractor of FIG. 1 in a locked state.

A further problem with the prior art emergency locking retractors results from the prior art design of the vehicle sensor. A typical prior art emergency locking retractor is illustrated in U.S. Pat. No. 4,522,350 to Ernst, which is illustrated in FIG. 1 and indicated generally at 1. The prior art retractor 1 includes a vehicle sensor which uses a ball actuator 2, wherein a metal ball 3 is mounted in a saucer like receptacle 4 having sloping sides. When acceleration or deceleration of the vehicle is applied to the vehicle sensor 2, the ball 3 is caused to roll up the side walls of the saucer 4 at a predetermined acceleration level which is dependent upon the angle of the side walls of the saucer 4. Riding over the top of the ball is a saucer shaped cap 5 which is mounted on one side by a jointed pair of pivot bearings 6. The upper portion of the cap 5 includes a reaching ball tip 7 which engages the locking mechanisms of the retractor 1. Upon displacement of the ball 3 from its resting position, the ball 3 will ride up the side walls of the saucer 4, displacing the cap 5 and forcing the pawl 8 to be displaced upwards, thus engaging the pawl 8 into the ratchet teeth 9 of the locking mechanism. The retractor 1 is shown in its locked position in FIG. 2. The conical shape of the cap 5 which engages the top of the ball 3 also aids in this upward movement.

Experience has shown that this prior art device has an inherent problem, particularly on vehicles where the vehicle sensor 2 is mounted in a position distant to the center of gravity of the vehicle. In this location, it is possible for the vehicle sensor 2 to be excited in a vertical direction by accelerations exceeding 1 g. For instance, if the vehicle sensor 2 is accelerated downwards, the ball 13 is left behind and suspended in space, thus driving the pawl 8 upwards into engagement with the locking mechanism 9. This result is undesirable in that it causes the retractor 1 to lock when the vehicle is traveling at a constant horizontal velocity, and under these conditions, locking is not desirable.

Finally, withdrawal forces applied to the webbing of a locked prior art retractor in an emergency situation are transmitted to the components of the sensor in the locking initiation mechanism. A retractor design which isolates the sensor and locking initiation mechanism from webbing withdrawal forces would be a substantial improvement over the prior art designs.

There is therefore a need in the prior art for an emergency locking seatbelt retractor which allows the seatbelt to be applied by the passenger when the vehicle is parked and inclined from the horizontal, which allows the webbing to be withdrawn by the user at a very rapid pace without locking the retractor prior to application of the seatbelt to the passenger, which will not lock-up when the webbing is allowed to retract rapidly into the retractor, which will not lock when the vehicle accelerates in a downward direction, and which isolates the sensor and locking initiation mechanism from webbing withdrawal forces. The present invention is directed toward meeting these needs.

SUMMARY OF THE INVENTION

The present invention relates to an emergency locking seatbelt retractor. The retractor includes a pivoting lock plate which can pivot through a limited arc during activation of a webbing sensor or a vehicle sensor. When the lock plate is in its quiescent position, a pin thereon operates to hold a lock bar out of engagement with ratchet teeth on the webbing spool, thereby allowing free rotation of the spool. If either or both of the webbing sensor and vehicle sensor are activated, the lock plate is caused to pivot, drawing the pin away from the lock bar and allowing the lock bar to engage the ratchet teeth, thereby locking the retractor. Additionally, the locking initiation mechanism (the lock plate) and the sensors are isolated from webbing withdrawal forces. The retractor includes a vehicle sensor which is effective in substantially eliminating any vertical motion of the sensor ball. This prevents the retractor from locking when it is subjected to a downward acceleration.

In one form of the invention an emergency locking seatbelt retractor is disclosed, comprising a spool shaft; first and second spool side flanges coupled to the spool shaft, the first and second spool side flanges having a spool diameter; a plurality of ratchet teeth circumferentially disposed about the first and second spool side flanges; a lock bar operative to selectively engage the ratchet teeth, thereby preventing rotation of the spool shaft in a first direction; a quantity of webbing material fixedly attached to the spool shaft and wound therearound in a retracted position; means for initiating engagement of the lock bar with the ratchet teeth; and means to isolate the means for initiating from withdrawal forces applied to the lock bar once the lock bar has engaged the ratchet teeth.

In another form of the invention an emergency locking seatbelt retractor is disclosed, comprising a spool shaft; first and second spool side flanges coupled to the spool shaft, the first and second spool side flanges having a spool diameter; a plurality of ratchet teeth circumferentially disposed about the first and second spool side flanges; a lock bar operative to selectively engage the ratchet teeth, thereby preventing rotation of the spool shaft in a first direction; a lock bar spring operative to bias the lock bar toward engagement with the ratchet teeth; a quantity of webbing material fixedly attached to the spool shaft and wound therearound in a retracted position; a lock plate rotatable through a limited arc between a first position and a second position; a toothed wheel mounted to the spool shaft for rotation therewith and selectively engageable with the lock plate; and an emergency sensor operative to couple the lock plate to the toothed wheel when activated; wherein the lock plate remains in the first position when the emergency sensor is not activated and biases the lock bar against the lock bar spring, thereby preventing engagement between the lock bar and the ratchet teeth; and wherein activation of the emergency sensor causes the lock plate to couple to the toothed wheel, thereby rotating the lock plate to the second position upon withdrawal of the webbing from the retractor, the lock plate thereby ceasing to bias the lock bar and allowing the lock bar spring to bias the lock bar toward engagement with the ratchet teeth.

In another form of the invention an emergency locking seatbelt retractor is disclosed, comprising: a spool shaft; first and second spool side flanges coupled to the spool shaft, the first and second spool side flanges having a spool diameter; a plurality of ratchet teeth circumferentially disposed about the first and second spool side flanges; a lock bar operative to selectively engage the ratchet teeth, thereby preventing rotation of the spool shaft in a first direction; a quantity of webbing material fixedly attached to the spool shaft and wound therearound in a retracted position; and a vehicle sensor operative to bias the lock bar toward engagement with the ratchet teeth in response to a lateral acceleration of the vehicle sensor above a predetermined limit, the vehicle sensor comprising a frame having a bottom frame surface; a spherical ball positioned on the bottom frame surface; a cap pivotally mounted to the frame, the cap covering an upper portion of the ball; and an arm coupled to the frame and extending through the cap, wherein the arm limits vertical movement of the ball without limiting lateral movement of the ball; wherein horizontal movement of the ball relative to the frame pivots the cap in a vertical direction, causing the lock bar to be biased toward engagement with the ratchet teeth.

DETAILED DESCRIPTION OF THE PREFERRED EMBODIMENT

For the purposes of promoting an understanding of the principles of the invention, refrence will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
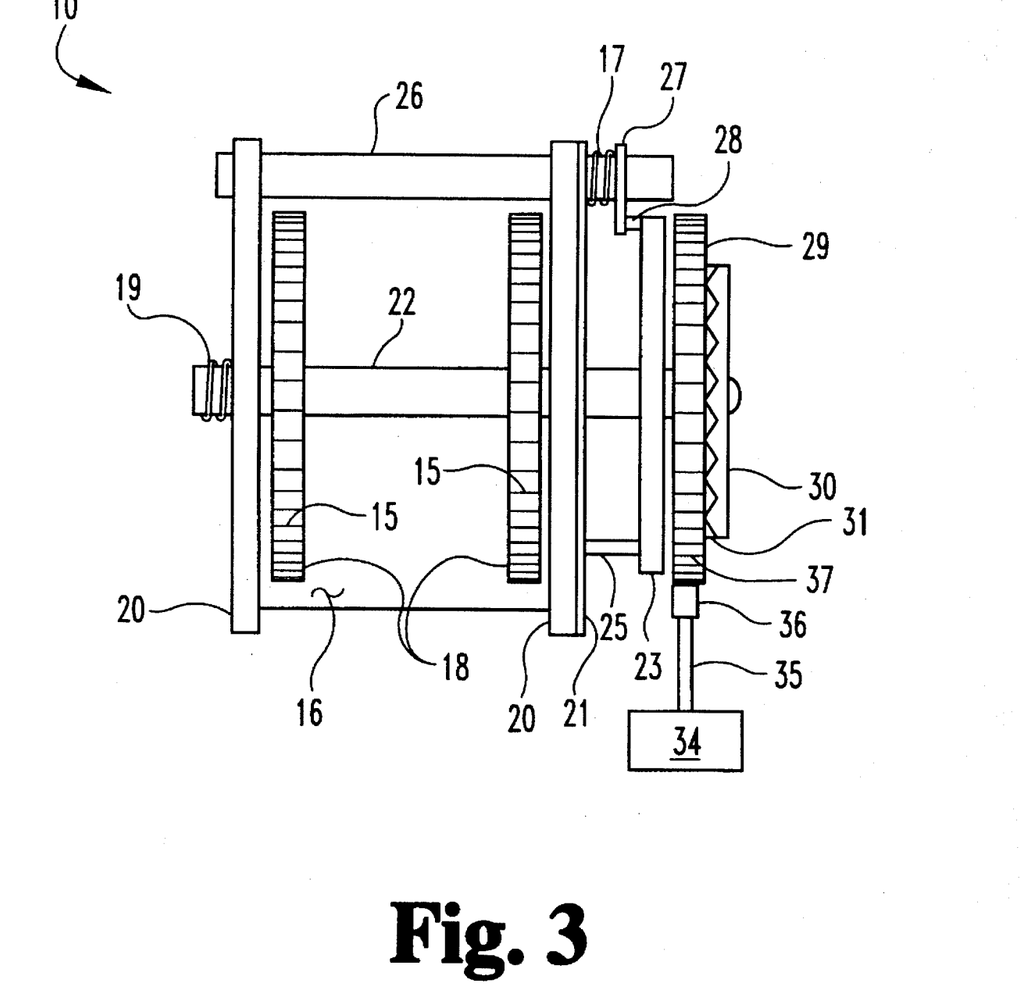
FIG. 3 is a semi-schematic first elevational view of an emergency locking retractor of the present invention.

The emergency locking seatbelt retractor of the present invention is illustrated semi-schematically in FIG. 3 and indicated generally at 10. The retractor 10 consists of a load carrying metal frame 16 that is formed into a U-shaped section having two side flanges 20. The frame 16 carries a spool shaft 22 which is journalled through the side flanges 20. The spool shaft 22 includes two spool side flanges 18 which are fixed to the shaft 22 and have formed on their perimeters ratchet locking tooth profiles 15. The spool accommodates a quantity of seatbelt webbing (not shown) which is stored on the spool when the webbing is in its retracted position. Mounted to one end of the spool shaft 22 is a conventional spring cassette 19 which drives the spool shaft 22 and side flanges 18 in the direction to effect retraction of the webbing.

Figure 5:
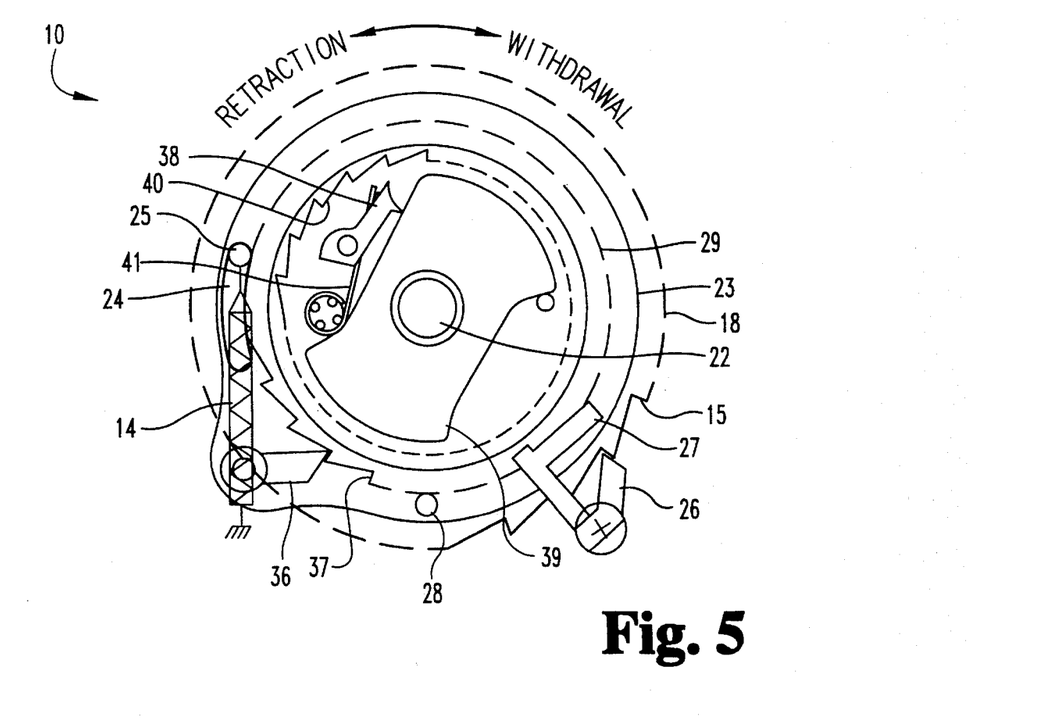
FIG. 5 is a semi-schematic second elevational view of the emergency locking retractor of the present invention in a locked state with the vehicle sensor activated.
Figure 6:
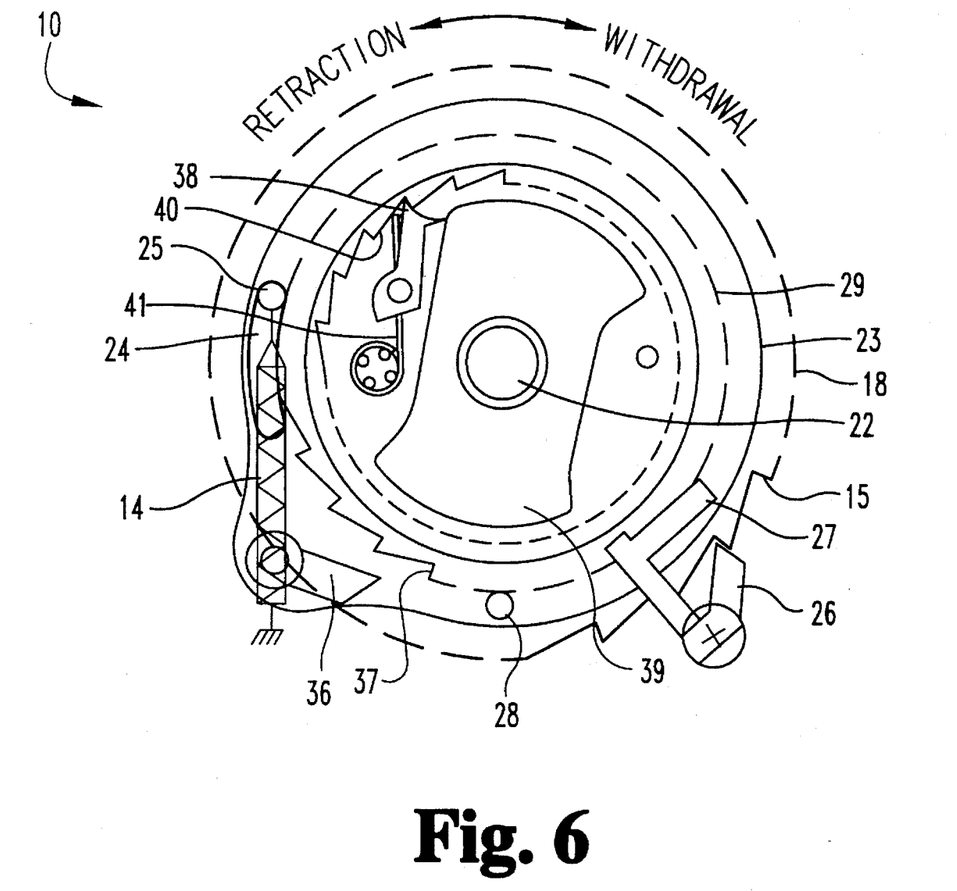
FIG. 6 is a semi-schematic second elevational view of the emergency locking retractor of the present invention in a locked state with the webbing sensor activated.
Figure 7:
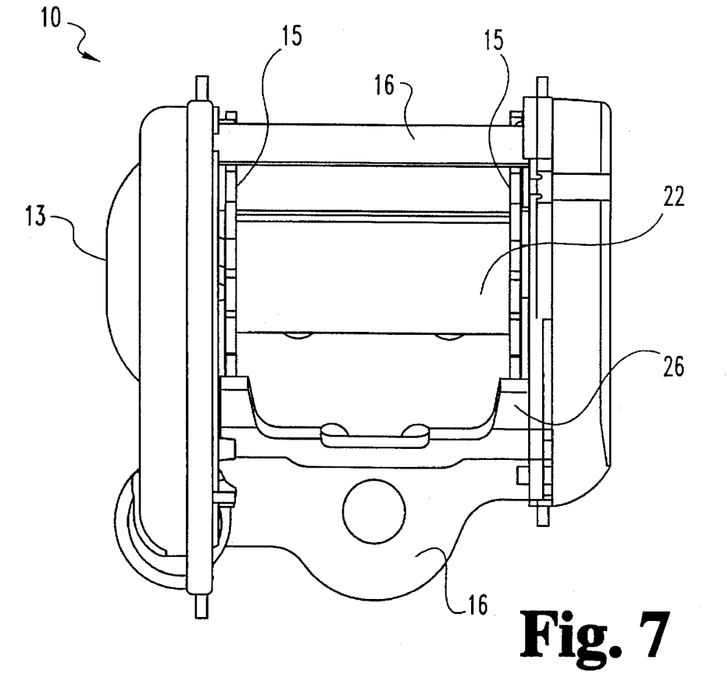
FIG. 7 is a side elevational view of a preferred embodiment emergency locking retractor of the present invention.
Figure 8:
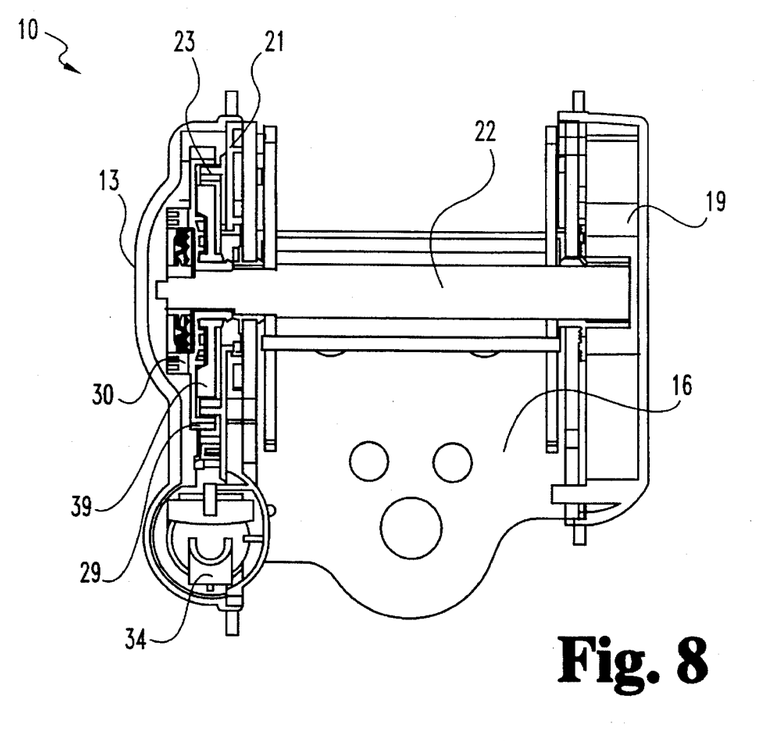
FIG. 8 is a cross-sectional view of the emergency locking retractor of the present invention.

A plastic back plate 21 is fixedly mounted to the outer side of one frame flange 20 such that the spool shaft 22 extends freely through the back plate 21. A lock plate 23 is pivotally mounted coaxial with the spool shaft 22 outwardly of back plate 21. The lock plate 23 includes a limiting pin 25 which extends through a limiting arcuate slot 24 (see FIG. 4) formed in the back plate 21 to engage a return spring 14 (see FIG. 4) that biases the lock plate 23 in the direction of webbing retraction. Spring 14 is depicted in FIGS. 4–6 as a helical spring for purposes of drawing clarity, however the preferred embodiment of spring 14 takes the form illustrated in FIG. 11.

The ratchet locking teeth 15 on the spool side flanges 18 are selectively engaged by a lock bar 26 which is mounted across the frame 16 and displaced from the center of rotation of the spool shaft 22. The lock bar 26 is free to be rotated into and out of mesh with the ratchet teeth 15 of the spool assembly. The lock bar 26 is urged into its engagement position with the ratchet teeth 15 by means of a spring 17.

Also projecting from behind the lock plate 23 is a pin 28 which engages a lever 27 fixed to the lock bar 26. When the lock plate 23 is held in its normal position due to the bias tension produced by the return spring 14, the pin 28 engages the lever 27, thereby holding the lock bar 26 out of engagement with the tooth profiles 15. The lever 27 extends inwardly from the center of pivot of the lock bar 26 toward the center of the spool shaft 22. When the lock plate 23 is rotated in a belt withdrawal direction (against the return spring 14), the pin 28 moves away from the lock bar lever 27, thus allowing the lock bar 26 to rotate by the force of bias spring 17 and engage the ratchet teeth 15. This prevents further rotation of the spool in the withdrawal direction.

Figure 4:
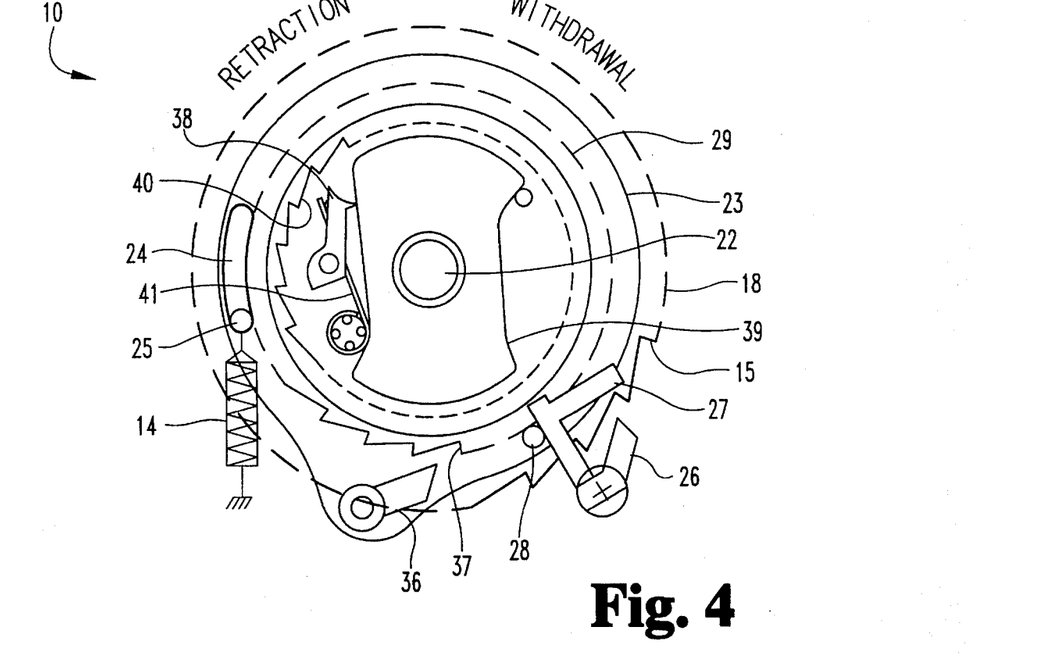
FIG. 4 is a semi-schematic second elevational view of the emergency locking retractor of the present invention in an unlocked state.

With reference to FIGS. 3 and 4, an external toothed wheel 29 is pivotally mounted to the shaft 22 outwardly of the lock plate 23. A freewheeling fly weight 39 is mounted inside the toothed wheel 29. A pawl 38 is pivotally mounted to the inner face of the toothed wheel 29 and positioned to be engageable with the inward facing teeth 40 of the lock plate 23. A torsion spring 41 biases the pawl 38 out of engagement with the inward facing teeth 40.

A clutch plate 30 (see FIG. 3) is mounted outwardly of the toothed wheel 29 and fixed to the shaft 22 in order to prevent any relative rotation between the clutch plate 30 and the shaft 22. The clutch plate 30 includes on its inward face a series of shallow clutch teeth 31 having incremental triangular form which engage matching clutch teeth 31 formed on the outward face of the toothed wheel 29. Under normal conditions, the toothed wheel 29 will rotate with the shaft 22 and clutch plate 30, but when the toothed wheel 29 is held against rotation (as explained hereinbelow), the clutch teeth 31 will slip at a predetermined torque and allow independent rotation of the shaft 22 relative to the toothed wheel 29. One advantage provided by the clutch plate 30 is that it protects the retractor from abuse caused by web withdrawal prior to installation in the vehicle.

Facing radially outward of the toothed wheel 29 is an array of ratchet teeth 37 (see FIG. 3) which are engageable by a pawl 36 mounted to an extension of the lock plate 23. The pawl 36 is rotatably driven into engagement with the ratchet teeth 37 by activation of the vehicle sensor 34 through the push rod 35.

The operation of the device will now be explained with reference mainly to FIGS. 4–6. The flyweight 39 interacting with the pawl 38 comprises the webbing sensor of the retractor 10. The sensor 34 of FIG. 3 interacting with the pawl 36 comprises the vehicle sensor of the retractor 10. With the webbing fully retracted onto the retractor 10, the web diameter is greater than the diameter of the spool side flanges 18. In the fully retracted position, therefore, the web material extends beyond the ratchet locking teeth 15, thereby preventing engagement of the lock bar 26 with the ratchet teeth 15. The diameter of the spool side flanges 18 is designed such that the retracted webbing extends beyond the ratchet teeth 15 until such time as sufficient webbing has been withdrawn from the retractor 10 to accommodate a normal wearing position. Therefore, activation of either the webbing sensor or the vehicle sensor will not cause the emergency locking function of the retractor 10 to be engaged until sufficient webbing has been withdrawn to accommodate the normal wearing position, ensuring that the retractor 10 will not lock unless the passenger is wearing the seatbelt.

Furthermore, with the webbing fully retracted and in normal conditions, the lock bar 26 is held out of engagement with the ratchet teeth 15 by means of the lock plate bias spring 14 overcoming the lock bar bias spring 17. The lock plate 23 is therefore normally biased by the spring 14 to position the pin 28 against the lever 27, thereby holding the lock bar 26 out of engagement with the ratchet teeth 15. As shown in FIG. 4, as the webbing is withdrawn under normal operation, the lock plate 23 is biased by the spring 14 to hold pin 28 against lever 27, thereby maintaining the lock bar 26 in an unlocked state.

In the event that the vehicle is parked on an inclined plane, thereby activating the vehicle sensor 34, the pawl 36 mounted to the lock plate 23 is moved into locking engagement with the ratchet teeth 37 of the toothed wheel 29, as shown in FIG. 5. Further webbing withdrawal will then rotate the toothed wheel 29 and lock plate 23 to remove the pin 28 from the lever 27, thereby allowing the spring 17 to bias the lock bar 26 toward the spool ratchet teeth 15. Because the webbing is fully retracted within the retractor 10, however, the webbing diameter prevents the lock bar 26 from actually engaging the ratchet teeth 15. Because the pawl 36 is engaged with the ratchet teeth 37 of the toothed wheel 29, further withdrawal of the webbing attempts to rotate the lock plate 23 in the clockwise direction of FIG. 5; however, the engagement of the limiting pin 25 with the arcuate slot 24 limits the rotation of the lock plate 23. Once the limit of rotation of lock plate 23 has been reached, further torquing of the spool shaft 22 by withdrawal of webbing causes the clutch teeth 31 to slip allowing further withdrawal of the webbing and producing a rather loud clicking noise. Continued withdrawal of the webbing is only possible until such time as sufficient webbing has been withdrawn to reduce the diameter of the webbing on the spool to be less than the diameter of the ratchet teeth 15. At this time, the lock bar 26 is able to engage the ratchet teeth 15, thereby preventing all further rotation of the spool. The point at which such locking occurs corresponds to a small amount of webbing withdrawn from the retractor 10, for example, six inches of webbing. Therefore, a warning is provided to the user once sensor 34 has locked and webbing is withdrawn from the fully retracted position. The noise or warning continues as the web is withdrawn until the diameter of the spool webbing decreases to less than the diameter of the ratchet teeth 15.

It will be appreciated by those skilled in the art that on some installations, a full spool of webbing may not be required. Depending upon the required amount of webbing storage on the reel, the webbing diameter may not become greater than the spool diameter in the fully retracted position. In such situations, the lock bar 26 may be formed with a projecting member (not shown) to contact the webbing at any predetermined diameter and so hold the lock bar 26 from engagement with the ratchet teeth 15.

In a similar manner, the webbing sensor may be activated by rapidly withdrawing the webbing from the retractor 10, causing the flyweight 39 to lag the rapid rotation of the toothed wheel 29 and spool axle 22. As illustrated in FIG. 6, the lagging of the flyweight 39 behind the toothed wheel 29 causes the flyweight pawl 38 to be urged into engagement with the inward facing teeth 40 of the lock plate 23. The engagement of the pawl 38 with the teeth 40 has the same effect on the retractor 10 as does the engagement of the pawl 36 with the teeth 37 as described hereinabove. As in the prior instance, the pin 28 no longer prevents the spring 17 from biasing the lock bar 26 toward the ratchet teeth 15 which will lock the retractor 10 once a sufficient amount of webbing has been withdrawn therefrom to decrease the diameter of the spool webbing to less than the diameter of the ratchet teeth 15.

Once the retractor 10 is in normal use, the spool is allowed to freewheel since the lock bar 26 is held out of engagement with the ratchet teeth 15 by means of the engagement of pin 28 and lever 27. In this unlocked position, passenger comfort is maintained by allowing withdrawal and automatic retraction of the webbing during movement of the passenger. Upon braking or crash acceleration exceeding a predetermined level, the vehicle sensor 34 will activate, causing the pawl 36 to engage the toothed wheel 29, thereby locking the toothed wheel 29 to the lock plate 23. In the event that the acceleration is sufficient, then webbing will be withdrawn rapidly from the retractor 10, causing axial rotation of the lock plate 23 so as to displace pin 28 from the lever 27. This allows the bias spring 17 to drive the lock bar 26 into engagement with the ratchet teeth 15. Alternatively or simultaneously, rapid webbing withdrawal causes the flyweight 39 to lag, causing pawl 38 to engage teeth 40, thereby locking the toothed wheel 29 to the lock plate 23 and causing the same sequence of events as when the pawl 36 locks the toothed wheel to the lock plate. This is the normal locking sequence. At this point, the spool is locked and further webbing withdrawal is prevented until pressure is released on the web wherein the system is reset.

If rapid webbing retraction is suddenly stopped at the fully stored position, the webbing sensor of the retractor 10 will be activated. However, unlike the prior art devices, subsequent withdrawal of the webbing from the retractor 10 is made possible by the slipping of the clutch teeth 31 in response to shaft torque caused by webbing withdrawal. The incremental timing of all ratchet tooth arrays are synchronized in order to allow the lock bar 26 to approach the gaps between the teeth 15, thus avoiding tooth-to-tooth engagement or tooth bounce. The triangular form of the clutch teeth 31 ensures that after slippage therebetween, the timing of the teeth 15 and 37 is restored. Thus, the toothed wheel 29 and the clutch plate 30 are incrementally positioned when the lock plate 23 is in its normal (non-rotated) position.

As will be appreciated by those skilled in the art from the above description, the vehicle sensor and the webbing sensor each function as means for initiating engagement of the lock bar 26 with the ratchet teeth 15. Furthermore, the lock plate 23 and the toothed wheel 29 function together as means for isolating the vehicle and webbing sensors from withdrawal forces applied to the lock bar 26 once the lock bar 26 has engaged the ratchet teeth 15. Finally, the clutch plate 30 and clutch teeth 31 function together as noise means which provide a noise warning when a predetermined amount of the webbing material is withdrawn from the spool shag 22 in the retracted position while either or both of the sensors are in a locked position.

Figure 9:
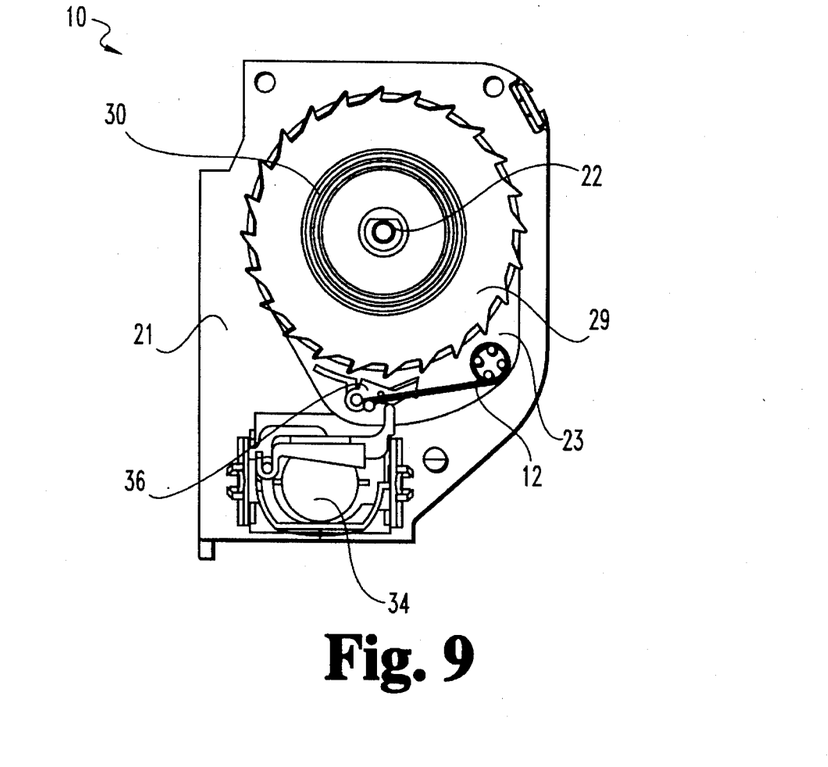
FIG. 9 is a side elevational view of the emergency locking retractor of the present invention with the side cover removed.
Figure 10:
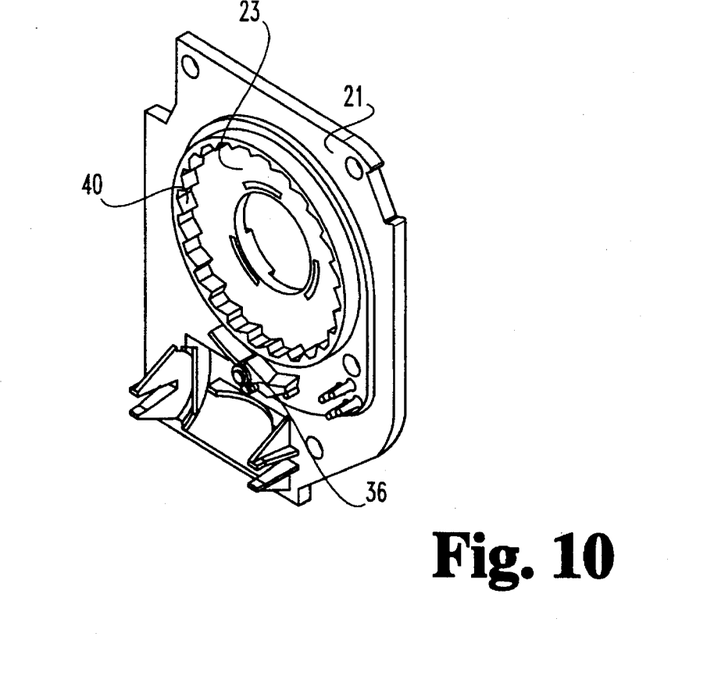
FIG. 10 is a perspective view of a back plate and lock plate of the preferred embodiment emergency locking retractor of the present invention.
Figure 11:
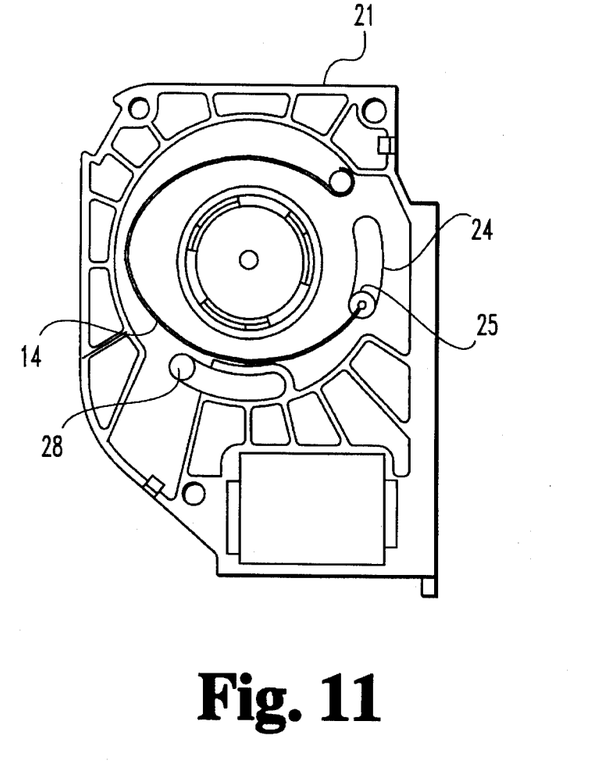
FIG. 11 is a rear elevational view of the back plate of the preferred embodiment emergency locking retractor of the present invention.
Figure 12:
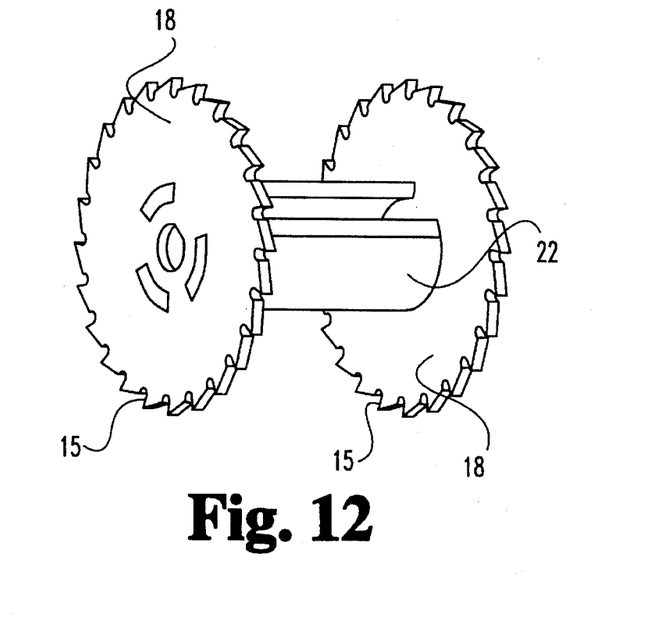
FIG. 12 is a perspective view of a webbing spool of the preferred embodiment emergency locking retractor of the present invention.

While the emergency locking seatbelt retractor 10 of the present invention has been illustrated semi-schematically in FIGS. 3–6, a preferred embodiment design of the seatbelt retractor 10 is illustrated in FIGS. 7–12. The side elevational view of FIG. 7 includes a mechanism cover 13 which covers many of the moving parts of the retractor 10, such as the toothed wheel 29, the clutch plate 30 and the vehicle sensor 34. The retractor 10 is illustrated in cross-section in FIG. 8, in which the various parts are visible within the mechanism cover 13. FIG. 9 illustrates a side elevational view of the retractor 10 with the cover 13 removed. A preferred embodiment of the vehicle sensor 34 is visible in this view, and is described in greater detail hereinbelow. Also visible in the view of FIG. 9 is a bias spring 12 which biases the vehicle sensor pawl 36 away from engagement with the toothed wheel 29. The bias spring 12 therefore prevents engagement of the pawl 36 with the toothed wheel 29 when the vehicle accelerates in a downward (vertical) direction. FIG. 10 illustrates a perspective view of the back plate 21 and attached lock plate 23. The inward facing teeth 40 are visible in this view. FIG. 11 illustrates a rear elevational view of the back plate 21, in which the return spring 14 and limiting pin 25 are visible, as is the arcuate slot 24. FIG. 12 illustrates a perspective view of the spool assembly comprising the spool shaft 22 and the spool side flanges 18 with the webbing removed therefrom.

Figure 13:
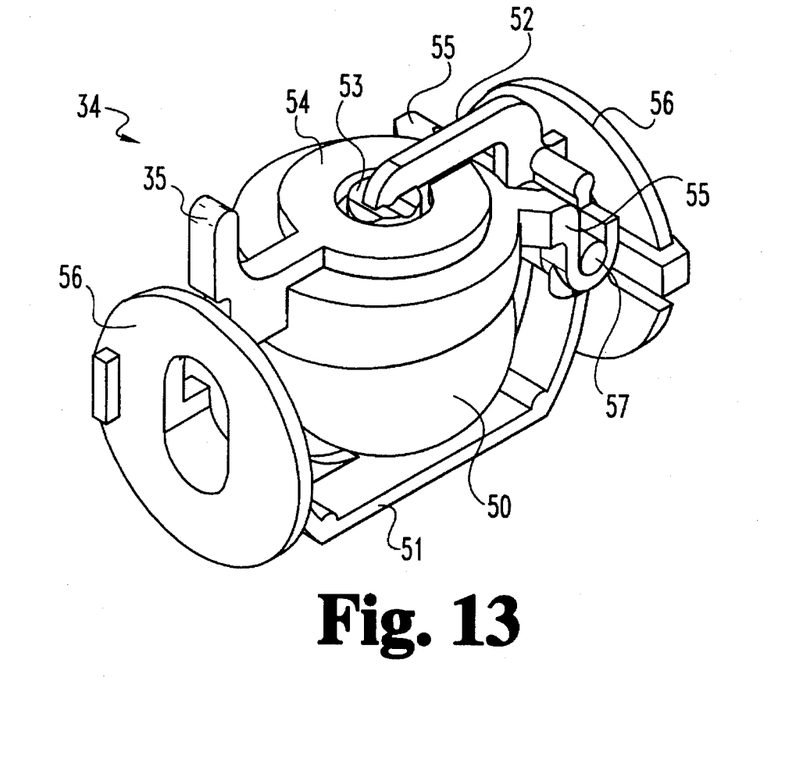
FIG. 13 is a perspective view of a preferred embodiment vehicle sensor of the present invention.

Referring now to FIG. 13, a preferred embodiment of the vehicle sensor 34 of the present invention is illustrated in a perspective view. As explained hereinabove, prior art vehicle sensors employ a conical cap 5 which rides over the top of the ball 3 (see FIGS. 1–2). Upon displacement of the ball 3 from its resting position, the ball 3 rides up the side walls of the saucer 4, displacing the cap 5 upwards and engaging the pawl 8 with the locking mechanism 9. Because it is possible for the prior art device to unintentionally lock the retractor when the device is accelerated in a downward direction, the device 34 of the present invention employs a design which will prevent such an unintended occurrence.

The vehicle sensor 34 of the present invention includes a metal ball 50 which rests within a C-frame 51 rather than in the saucer 4 of the prior art devices. The C-frame 51 of the vehicle sensor 34 includes an arm 52 which extends over the top of the ball 50. The arm 52 includes a limiting pad 53 at the distal end thereof which prevents any substantial upward movement of the ball 50 in response to an acceleration of the vehicle sensor 34 in the downward direction. A slight clearance is maintained between the bottom of the limiting pad 53 and the top of the ball 50 so that the ball 50 is free to move in any lateral direction (with respect to the C-frame 51) without interference from the limiting pad 53.

The upper surface of the ball 50 is engaged by a pawl cap 54 carried on a pair of support arms 55 pivotally attached to the frame 51 at a position to one side of the ball 50 and at a level which is substantially at a level corresponding to the center of the ball 50. Extending from the cap 54 horizontally from the other side of the ball 50 and then in a vertical direction is a push rod 35 which is operative to engage the pawl 36 upon displacement of the ball 50. Finally, the C-frame 51 includes two side flanges 56 which mount to the back plate 21 of the retractor 10.

In operation, any attempted vertical movement of the ball 50 is prevented by the limiting pad 53 on the end of the arm 52. Downward acceleration of the vehicle sensor 34, therefore, does not substantially move the cap 54 or the push rod 35, thereby preventing the retractor 10 from locking. However, any horizontal (lateral) movement of the ball 50 causes the ball to press against the inside of the cap 54, thereby causing the cap 54 to move upwards, pivoting about its pivot points 57. This will also cause the push rod 35 to move in a substantially vertical direction, engaging the pawl 36 and thereby locking the retractor 10. The mass of the ball 50 greatly exceeds the mass of the cap 54, therefore a bias spring 12 (see FIG. 9) is used to bias the cap 54 onto the ball 50. By varying the pre-tensioning of the spring 12, the amount of force or acceleration which will cause movement of the push rod 35 can be set to a predetermined value. The resultant combination, therefore, is that the vehicle sensor 34 is not sensitive to vertical acceleration and may be selectively tuned to meet the desired level of lateral acceleration sensitivity without changing components of the vehicle sensor 34, such as a different cap 54.

Figure 14:
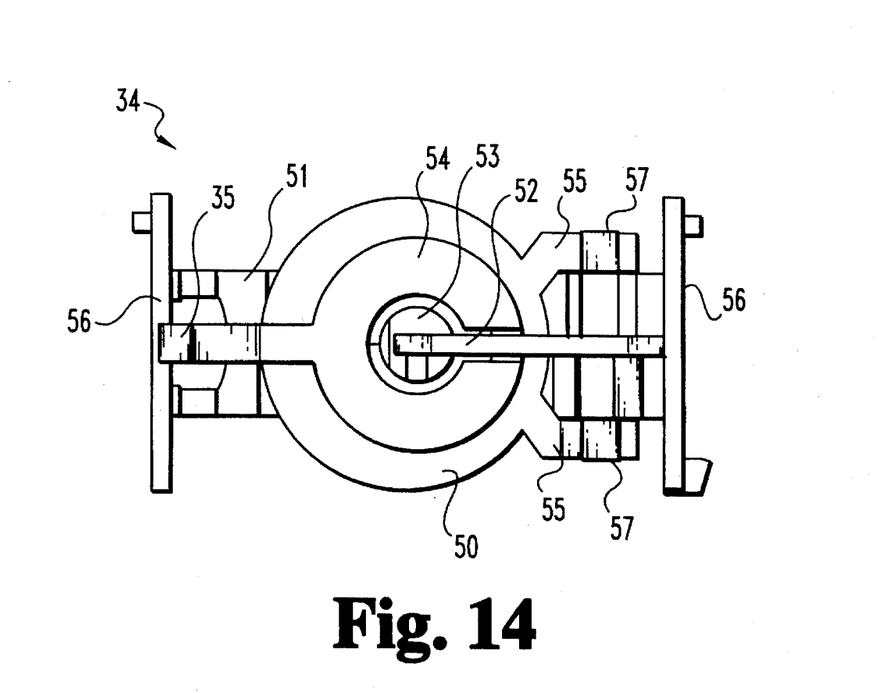
FIG. 14 is a top plan view of the preferred embodiment vehicle sensor of the present invention.
Figure 15:
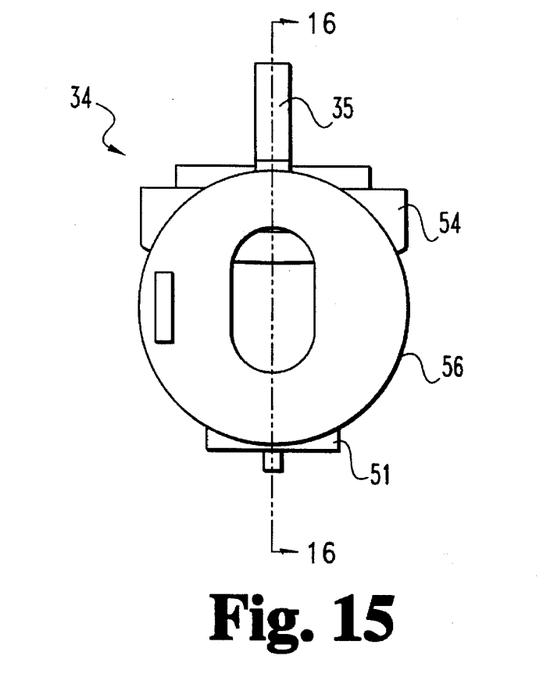
FIG. 15 is an end elevational view of the preferred embodiment vehicle sensor of the present invention.
Figure 16:
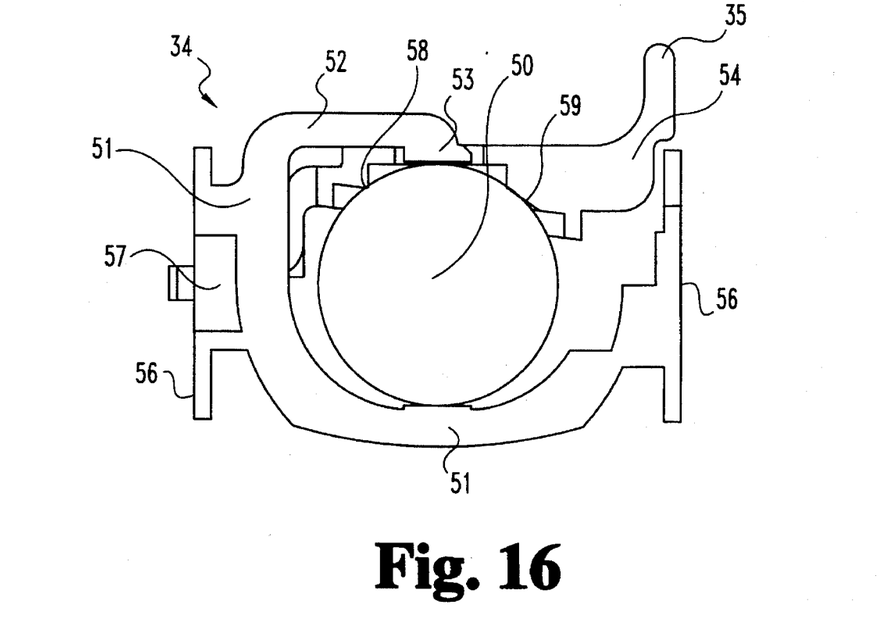
FIG. 16 is a cross-sectional view of the preferred embodiment vehicle sensor of the present invention.

The vehicle sensor 34 is illustrated in FIG. 14 in a top plan view, and in FIG. 15 in a side elevational view. FIG. 16 illustrates the vehicle sensor 34 in a cross-sectional view. It is apparent in the cross-sectional view of FIG. 16 that the cap 54 contacts the top of the ball 50 on opposite quadrants of the ball 50. Therefore, the distance from the pivot point 57 to one quadrant contact point is different from the distance from the pivot point 57 to the other quadrant contact point. This results in different forces being required to lift the cap 54, depending upon which way the ball 50 moves. This moment problem is corrected by forming the contact zone between the cap 54 and the ball 50 at a downward sloping angle atop the ball 50, resulting in the quadrant contact point 58 on the ball 50 near the pivot point 57 being at an elevation which is higher than the opposite quadrant contact point 59. The result is that approximately the same lifting force is applied to the cap 54 (and hence the push rod 35) no matter in which direction the ball 50 is accelerated.

It will be appreciated by those skilled in the art that the vehicle sensor 34 of the present invention represents an improvement over prior art devices due to the fact that vertical movement of the ball 50 is substantially eliminated. Furthermore, the C-frame 51 provides unrestrained horizontal movement of the ball 50 and the design of the cap 54 produces substantially equal lifting forces on the push rod 35 no matter in which horizontal direction the ball 50 is accelerated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An emergency locking seatbelt retractor, comprising:
   a spool shaft;
   first and second spool side flanges coupled to the spool shaft, the first and second spool side flanges having a spool diameter;
   a plurality of ratchet teeth circumferentially disposed about the first and second spool side flanges;
   a lock bar operative to selectively engage the ratchet teeth, thereby preventing rotation of the spool shaft in a first direction;
   a quantity of webbing material fixedly attached to the spool shaft and wound therearound in a retracted position;
   means for initiating engagement of the lock bar with the ratchet teeth; and
   means to isolate the means for initiating from withdrawal forces applied to the lock bar once the lock bar has engaged the ratchet teeth.

2. The emergency locking seatbelt retractor of claim 1, further comprising:
   a lock bar spring operative to bias the lock bar toward engagement with the ratchet teeth.

3. The emergency locking seatbelt retractor of claim 2, wherein the means to isolate comprises:
   a lock plate rotatable through a limited arc between a first position and a second position; and
   a toothed wheel mounted to the spool shaft for rotation therewith and selectively engageable with the lock plate.

4. The emergency locking seatbelt retractor of claim 3, further comprising:
   a clutch plate which couples the toothed wheel to the spool shaft;
   wherein the clutch plate is fixedly attached to the spool shaft and frictionally engaged with the toothed wheel; and
   wherein the clutch plate and the toothed wheel slide relative to one another when the lock plate is in the second position, a withdrawal force which is greater than a predetermined limit is applied to the webbing, and the lock bar is prevented from engagement with the ratchet teeth by the webbing diameter.

5. The emergency locking seatbelt retractor of claim 3, wherein the means for initiating comprises:
   an emergency sensor operative to couple the lock plate to the toothed wheel when activated;
   wherein the lock plate remains in the first position when the emergency sensor is not activated and biases the lock bar against the lock bar spring, thereby preventing engagement between the lock bar and the ratchet teeth; and
   wherein activation of the emergency sensor causes the lock plate to couple to the toothed wheel, thereby rotating the lock plate to the second position upon withdrawal of the webbing from the retractor, the lock plate thereby ceasing to bias the lock bar and allowing the lock bar spring to bias the lock bar toward engagement with the ratchet teeth.

6. The emergency locking seatbelt retractor of claim 5, wherein the emergency sensor comprises:
   a pawl pivotally mounted to the lock plate and selectively engageable with the toothed wheel; and
   a vehicle sensor operative to move the pawl into engagement with the toothed wheel in response to a lateral acceleration of the vehicle sensor above a predetermined limit.

7. The emergency locking seatbelt retractor of claim 6, wherein the vehicle sensor comprises:
- a frame having a bottom frame surface;
- a spherical ball positioned on the bottom frame surface;
- a cap pivotally mounted to the frame, the cap covering an upper portion of the ball; and
- an arm coupled to the frame and extending through the cap, wherein the arm limits vertical movement of the ball;
- wherein lateral movement of the ball relative to the frame pivots the cap in a vertical direction, causing the pawl to be biased into engagement with the toothed wheel.

8. The emergency locking seatbelt retractor of claim 5, wherein the emergency sensor comprises:
- a pawl pivotally mounted to the toothed wheel and selectively engageable with the lock plate; and
- a webbing sensor operative to move the pawl into engagement with the lock plate in response to withdrawal of the webbing at greater than a predetermined acceleration.

9. An emergency locking seatbelt retractor, comprising:
- a spool shaft;
- first and second spool side flanges coupled to the spool shaft, the first and second spool side flanges having a spool diameter;
- a plurality of ratchet teeth circumferentially disposed about the first and second spool side flanges;
- a lock bar operative to selectively engage the ratchet teeth, thereby preventing rotation of the spool shaft in a first direction;
- a lock bar spring operative to bias the lock bar toward engagement with the ratchet teeth;
- a quantity of webbing material fixedly attached to the spool shaft and wound therearound in a retracted position;
- a lock plate rotatable through a limited arc between a first position and a second position;
- a toothed wheel mounted to the spool shaft for rotation therewith and selectively engageable with the lock plate; and
- an emergency sensor operative to couple the lock plate to the toothed wheel when activated;
- wherein the lock plate remains in the first position when the emergency sensor is not activated and biases the lock bar against the lock bar spring, thereby preventing engagement between the lock bar and the ratchet teeth; and
- wherein activation of the emergency sensor causes the lock plate to couple to the toothed wheel, thereby rotating the lock plate to the second position upon withdrawal of the webbing from the retractor, the lock plate thereby ceasing to bias the lock bar and allowing the lock bar spring to bias the lock bar toward engagement with the ratchet teeth.

10. The emergency locking seatbelt retractor of claim 9, wherein a webbing diameter of the retracted webbing prevents engagement of the lock bar with the ratchet teeth until a sufficient amount of the webbing is withdrawn from the retractor.

11. The emergency locking seatbelt retractor of claim 10, further comprising:
- a clutch plate which couples the toothed wheel to the spool shaft;
- wherein the clutch plate is fixedly attached to the spool shaft and frictionally engaged with the toothed wheel; and
- wherein the clutch plate and the toothed wheel slide relative to one another when the lock plate is in the second position, a withdrawl force which is greater than a predetermined limit is applied to the webbing, and the webbing diameter prevents the lock bar from engagement with the ratchet teeth.

12. The emergency locking seatbelt retractor of claim 9, wherein the emergency sensor comprises:
- a pawl pivotally mounted to the lock plate and selectively engageable with the toothed wheel; and
- a vehicle sensor operative to move the pawl into engagement with the toothed wheel in response to a lateral acceleration of the vehicle sensor above a predetermined limit.

13. The emergency locking seatbelt retractor of claim 11, wherein the vehicle sensor comprises:
- a frame having a bottom frame surface;
- a spherical ball positioned on the bottom frame surface;
- a cap pivotally mounted to the frame, the cap covering an upper portion of the ball; and
- an arm coupled to the frame and extending through the cap, wherein the arm limits vertical movement of the ball without limiting lateral movement of the ball;
- wherein lateral movement of the ball relative to the frame pivots the cap in a vertical direction, causing the pawl to be biased toward engagement with the toothed wheel.

14. The emergency locking seatbelt retractor of claim 9, wherein the emergency sensor comprises:
- a pawl pivotally mounted to the toothed wheel and selectively engageable with the lock plate; and
- a webbing sensor operative to move the pawl into engagement with the lock plate in response to withdrawal of the webbing at greater than a predetermined acceleration.

15. An emergency locking seatbelt retractor, comprising:
- a spool shaft;
- first and second spool side flanges coupled to the spool shaft, the first and second spool side flanges having a spool diameter;
- a plurality of ratchet teeth circumferentially disposed about the first and second spool side flanges;
- a lock bar operative to selectively engage the ratchet teeth, thereby preventing rotation of the spool shaft in a first direction;
- a quantity of webbing material fixedly attached to the spool shaft and wound therearound in a retracted position; and
- a vehicle sensor operative to bias the lock bar toward engagement with the ratchet teeth in response to a lateral acceleration of the vehicle sensor above a predetermined limit, the vehicle sensor comprising:
  - a frame having a bottom frame surface;
  - a spherical ball positioned on the bottom frame surface;
  - a cap pivotally mounted to the frame, the cap covering an upper portion of the ball; and
  - an arm coupled to the frame and extending through the cap, wherein the arm limits vertical movement of the ball without limiting lateral movement of the ball;
  - wherein lateral movement of the ball relative to the frame pivots the cap in a vertical direction, causing the lock bar to be biased toward engagement with the ratchet teeth.

16. The emergency locking seatbelt retractor of claim 15, further comprising:

a lock bar torsion spring operative to bias the lock bar toward engagement with the ratchet teeth.

17. The emergency locking seatbelt retractor of claim 16, further comprising:

a lock plate mounted coaxial to the spool shaft and rotatable through a limited arc between a first position and a second position; and a toothed wheel mounted to the spool shaft for rotation therewith;

wherein the vehicle sensor operates to couple the lock plate to the toothed wheel when activated; and wherein the lock plate remains in the first position when the vehicle sensor is not activated and biases the lock bar against the lock bar torsion spring, thereby preventing engagement between the lock bar and the ratchet teeth; and wherein activation of the vehicle sensor causes the lock plate to couple to the toothed wheel, thereby rotating the lock plate to the second position upon withdrawal of the webbing from the retractor, the lock plate thereby ceasing to bias the lock bar and allowing the lock bar torsion spring to bias the lock bar toward engagement with the ratchet teeth.

18. The emergency locking seatbelt retractor of claim 17, further comprising:

a pawl pivotally mounted to the lock plate and selectively engageable with the toothed wheel;

wherein the cap is operative to move the pawl into engagement with the toothed wheel in response to a lateral acceleration of the vehicle sensor above a predetermined limit.

19. The emergency locking seatbelt retractor of claim 17, further comprising:

a clutch plate which couples the toothed wheel to the spool shaft;

wherein the clutch plate is fixedly attached to the spool shaft and frictionally engaged with the toothed wheel; and wherein the clutch plate and the toothed wheel slide relative to one another when the lock plate is in the second position, a withdrawal force which is greater than a predetermined limit is applied to the webbing, and the webbing diameter prevents engagement of the lock bar with the ratchet teeth.

20. The emergency locking seatbelt retractor of claim 19, wherein the clutch plate and the toothed wheel are spring biased into engagement; and wherein a clutch plate interface with the toothed wheel has incremental triangular form; and wherein the toothed wheel and the clutch plate are incrementally positioned when the lock plate is in the first position.

21. The emergency locking seatbelt retractor of claim 15, wherein a webbing diameter of the retracted webbing prevents engagement of the lock bar with the ratchet teeth until a sufficient amount of the webbing is withdrawn from the retractor.

22. The emergency locking seatbelt retractor of claim 15, wherein a pivot axis of the cap lies substantially in a plane passing through a center of the ball.

23. An emergency locking seatbelt retractor, comprising:

a spool shaft;

first and second spool side flanges coupled to the spool shaft, the first and second spool side flanges having a spool diameter;

a plurality of ratchet teeth circumferentially disposed about the first and second spool side flanges;

a lock bar operative to selectively engage the ratchet teeth, thereby preventing rotation of the spool shaft in a first direction;

a quantity of webbing material fixedly attached to the spool shaft and wound therearound in a retracted position, means for initiating engagement of the lock bar with the ratchet teeth with said means having a locked position and and unlocked position; and, noise means connected to said shaft operable to provide a noise warning when a predetermined amount of said webbing material is withdrawn from said spool shaft in said retracted position while said means for initiating is in said locked position.

24. The emergency locking seatbelt retractor of claim 23, wherein the noise means comprises a multi-toothed clutch plate.

25. An emergency locking seatbelt retractor, comprising:

a spool shaft;

first and second spool side flanges coupled to the spool shaft, the first and second spool side flanges having a spool diameter;

a plurality of ratchet teeth circumferentially disposed about the first and second spool side flanges;

a lock bar operative to selectively engage the ratchet teeth, thereby preventing rotation of the spool shaft in a first direction;

a quantity of webbing material fixedly attached to the spool shaft and wound therearound in a retracted position;

an initiator operable to initiate engagement of the lock bar with the ratchet teeth; and an isolator operable to isolate the initiator from withdrawal forces applied to the lock bar once the lock bar has engaged the ratchet teeth.

* * * * *

UNITED STATES PATENT AND TRADEMARK OFFICE
CERTIFICATE OF CORRECTION

PATENT NO. : 5,622,327
DATED : April 22, 1997
INVENTOR(S) : Heath, Chinni, Wallen, Anthony It is certified that error appears in the above-identified patent and that said Letters Patent is hereby corrected as shown below:

In column 1, line 36, please change "m" to --in--.

In column 2, line 33, please change "13" to --3--.

In column 8, line 15, please change "shag" to --shaft--.

In column 9, line 55, please change "lilting" to --lifting--.

In column 12, line 15, please change "11" to --12--.

Signed and Sealed this

Eighth Day of December, 1998

Attest:

BRUCE LEHMAN

*Attesting Officer*     *Commissioner of Patents and Trademarks*